(12) United States Patent
Stillerman et al.

(10) Patent No.: US 7,467,417 B2
(45) Date of Patent: Dec. 16, 2008

(54) ACTIVE VERIFICATION OF BOOT FIRMWARE

(75) Inventors: Matthew A Stillerman, Ithaca, NY (US); Dexter Kozen, Ithaca, NY (US); Thomas J Merritt, Pleasanton, CA (US)

(73) Assignee: Architecture Technology Corporation, Minneapolis, MN (US)

( * ) Notice: Subject to any disclaimer, the term of this patent is extended or adjusted under 35 U.S.C. 154(b) by 792 days.

(21) Appl. No.: 10/656,751

(22) Filed: Sep. 4, 2003

(65) Prior Publication Data

US 2008/0271163 A1 Oct. 30, 2008

Related U.S. Application Data

(60) Provisional application No. 60/479,657, filed on Jun. 18, 2003, provisional application No. 60/479,809, filed on Jun. 18, 2003.

(51) Int. Cl.
*H04L 9/32* (2006.01)
(52) U.S. Cl. .............................. 726/30; 726/21; 713/187
(58) Field of Classification Search ................. 713/156, 713/175, 190, 187; 726/21, 30
See application file for complete search history.

(56) References Cited

U.S. PATENT DOCUMENTS

| | | | |
|---|---|---|---|
| 6,185,678 B1 | 2/2001 | Arbaugh et al. | |
| 6,263,378 B1 * | 7/2001 | Rudoff et al. | 719/327 |
| 6,263,431 B1 * | 7/2001 | Lovelace et al. | 713/2 |
| 6,463,535 B1 * | 10/2002 | Drews | 713/176 |
| 6,757,824 B1 * | 6/2004 | England | 713/156 |
| 2004/0177258 A1 * | 9/2004 | Ong | 713/192 |

OTHER PUBLICATIONS

R. Stata et al., "A Type System for Java Bytecode Subroutines," Proceedings 25th Symposium Principles of Programming Languages, 149-160, ACM SIGPLAN/SIGACT, Jan. 1998.
Drew Dean et al., "Java Security: From HotJava to Netscape and Beyond," Proceedings Symposium Security and Privacy, IEEE, May 1996.

(Continued)

*Primary Examiner*—Andrew L Nalven
(74) *Attorney, Agent, or Firm*—Shumaker & Sieffert, P.A.

(57) ABSTRACT

Techniques are described for generating and actively verifying a boot code associated with a peripheral device of a computer system to prevent potential security threats the boot code may introduce into the computer system. The techniques for generating boot code entail generating the boot code from a high-level programming language using a verification application program interface (API). The API aids in generating a certificate, which is associated with the boot ode in that the certificate describes operation of the boot code. After generating the boot code and associated certificate, the two are loaded onto a memory module of the peripheral device. Once the peripheral device ie connected to the computer system, the computer system may retrieve the boot code and certificate. The computer system utilizes techniques to actively verify the boot code by performing a security check on the boot code in accordance with the associated certificate. Finally, the computer system executes the boot code based on a result of the security check.

36 Claims, 6 Drawing Sheets

OTHER PUBLICATIONS

William A. Arbaugh et al., "A Secure and Reliable Bootstrap Architecture," Proceedings 1997 IEEE Symposium on Security and Privacy, pp. 65-71, May 1997.

"IEEE Standard for Boot (Initialization Configuration) Firmware: Core Requirements and Practices," IEEE Standard, 266 pgs, 1994.

N. Glew et al., "Type-Safe Linking and Modular Assembly Language," Proceedings 26th Symposium Principles of Programming Languages, pp. 250-261. ACM SIGPLAN-SIGACT, Jan. 1999.

Robert Harper et al., "A Framework for Defining Logics," Journal of the Association for Computing Machinery, 40(1):143-184, Jan. 1993.

Dexter Kozen. "Efficient Code Certification," Technical Report 98-1661, Computer Science Department, Cornell University, pp. 1-17, Jan. 1998.

G. Morrisett et al., "TALx86: A Realistic Typed Assembly Language," Proceedings Workshop on Compiler Support for System Software, pp. 25-28. ACM SIGPLAN, May 1999.

G. Morrisett et al., "Stack-Based Typed Assembly Language," In Xavier Leroy and Atsushi Ohori, editors, Proceedings Workshop on Types in Compilation, vol. 1473 of Lecture Notes in Computer Science, Springer-Verlag, 23 pgs., Mar. 1998.

G. Morrisett et al., "The TIL/ML Compiler: Performance and Safety Through Types," 1996 Workshop on Compiler Support for Systems Software, 7 pgs., 1996.

G Morrisett et al., "From System F to Typed Assembly Language," 25th ACM SIGPLAN/SIGSIGACT Symposium on Principles of Programming Languages, pp. 85-97, San Diego California, USA, Jan. 1998.

George C. Necula, "Proof-Carrying Code," Proceedings 24th Symposium Principles of Programming Languages, ACM SIGPLAN/SIGACT, pp. 106-119, Jan. 1997.

George C. Necula, Compiling With Proofs, PhD Thesis, Carnegie Mellon University, 260 pgs., Sep. 1998.

George C. Necula et al., "Safe Kernel Extensions Without Run-Time Checking," Proceedings 2nd Symposium Operating System Design and Implementation, ACM, Oct. 1996.

George C. Necula et al., "The Design and Implementation of a Certifying Compiler," Proceedings Conference Programming Language Design and Implementation, pp. 333-344, ACM SIGPLAN, ACM SIGPLAN notices, 0362-1340; v. 33, No. 5, 1998.

George C. Necula et al., "Safe, Untrusted Agents Using Proof-Carrying Code," Giovanni Vigna, editor, Special Issue on Mobile Agent Security, vol. 1419 of Lecture Notes in Computer Science, pp. 61-91, Springer-Verlag, Jun. 1998.

Robert O'Callahan, "A Simple, Comprehensive Type System for Java Bytecode Subroutines," Proceedings 26th Symposium Principles of Programming Languages, pp. 70-78. ACM SIGPLAN/SIGACT, Jan. 1999.

Fred B. Schneider, editor, "Trust In Cyberspace," Committee on Information systems Trustworthiness, Computer Science and Telecommunications Board, National Research Council, National Academy Press, 254 pgs., 1998, www.antioffline.com/trust.in.cspace.html, printed Oct. 2004.

D. Tarditi et al., "TIL: A Type-Directed Optimizing Compiler for ML," Conference Programming Language Design and Implementation, ACM SIGPLAN, pp. 181-192, 1996.

R. Wahbe et al., "Efficient Software-Based Fault Isolation," Proceedings 14th Symposium Operating System Principles, vol. 27, No. 5, pp. 203-216, ACM, Dec. 1993.

D. Kozen, "Language-Based Security," Cornell University, Ithaca, NY.

F. Adelstein et al., "Malicious Code Detection for Open Firmware," 18th Annual Computer Security Application Conference, San Diego, CA, Dec. 2002.

\* cited by examiner

ACTIVE VERIFICATION OF BOOT FIRMWARE

This application claims priority from U.S. Provisional Application Ser. No. 60/479,657 and U.S. Provisional Application Ser. No. 60/479,809 filed Jun. 18, 2003, the contents being incorporated herein by reference.

STATEMENT REGARDING FEDERALLY SPONSORED RESEARCH OR DEVELOPMENT

This invention was made with Government support under Contract F30602-02-C-0161 awarded by the Air Force and Contract DAAH01-02-C-R080 awarded by the U.S. Army Aviation and Missile Command. The Government has certain rights in this invention.

TECHNICAL FIELD

The invention relates to computer systems and, more particularly, to techniques for improving resistance to attacks on computer systems.

BACKGROUND

During startup, at typical computing device, such as a desktop computer, invokes a boot process to initialize the computing device and associated peripheral devices. The process of initializing each peripheral device is typically controlled by software, referred to as boot firmware, which is often stored in a read-only memory (ROM) on the computing device or on the respective peripheral device. After the computing device executes the boot firmware associated with each peripheral device, the computing device launches an operating system and possibly other software applications.

Until the device loads the operating system and any subsequent security software applications that rely on the operating system, the computing device may be susceptible to attack. In particular, it is possible for boot firmware to introduce serious security threats either accidentally or maliciously prior to the execution of the operating system and any security software applications that otherwise may neutralize the posed security threat. As a result, by the time the operating system and security software applications are available, the security of the computing device may have already been compromised. Most conventional computing devices offer little resistance to security threats introduced by boot firmware.

In response to potential boot firmware security breaches, some computing devices provide security measures to ensure that the boot firmware comes from a trusted source. These security measures rely on digital signatures, which uniquely identify the source of the associated boot firmware. The computing device can decode a digital signature to identify the source of the boot firmware and accept or reject the boot firmware based on the source. In this manner, the computing device can gauge the reliability of boot firmware based on the source, allowing the computing device to execute only boot firmware from trusted sources.

One potential deficiency of this approach is that these approaches do not scale well. Typically, there are numerous sources generating boot firmware and the number of sources is growing. Furthermore, every new source must be verified so that the associated boot firmware may be executed. Thus, this approach yields to difficulties that arise as the number of sources grows, since the approach is dependent on the source.

Another potential deficiency of this approach is that the computing device may verify the reliability of the boot firmware only once. More specifically, the computing device receives the boot firmware and associated digital signature from the peripheral device, decodes the digital signature to accept or reject the boot firmware and executes only the accepted boot firmware. Thereafter, however, the computing device executes the boot firmware and assumes that the boot firmware is from the reliable source and has not changed. Other security measures may determine changes since the boot firmware was accepted and executes only boot firmware that has not changed from the accepted boot firmware. A computing device may use these two security measures in conjunction in an attempt to prevent the execution of boot firmware from unreliable sources, which may be malicious in nature, and prevent reliable boot firmware from being altered with malicious intent.

However, these security measures are passive measures, enforcing security by preserving trust, such as verifying the reputation of a source. Boot firmware from a malicious source can be installed under the guise of a reliable source, e.g., by misappropriating the digital credentials of the reliable source. In addition, even reliable sources can produce boot firmware that poses security threats accidentally through programmer error. Both of these pose threat which passive security measures are incapable of preventing.

SUMMARY

In general, the invention is directed to techniques for ensuring safe operation of boot code in a computer system. The techniques describe processes to generate and verify boot code such that the computer system may only execute boot code that meets specified safety standards. The techniques may be useful in determining the safety of boot code independent of the reliability of a source that generated the boot code, thereby establishing trust.

In accordance with the principles of the invention, a certifying compiler can be used to generate a boot code and a certificate that allows a verification module to quickly verify the safe operation of the boot code. The certifying compiler may further comprise a program to generate the boot code and the certificate. Upon completion of the boot code and certificate, both may be loaded into a memory module of a peripheral device for use during initialization.

During initialization, the peripheral device having the memory module that stores the boot code and the associated certificate, communicates the boot code and the associated certificate to a computer system. The computer system executes the verification module, which actively verifies the security and safe operation of the boot code with aid from the certificate. The verification module may perform a security check to actively ensure a variety of specified safety standards are met. Upon completion of the verification process, the verification module either declares the boot code safe or unsafe, dependant on the outcome of the security check. In this manner, the certifying compiler and verification module enable the computer system to actively gauge the safety of the boot code independent of the source. Furthermore, since the verification module may verify the safety of the boot code independent of the source, issues of scale may not affect the verification module.

In one embodiment, the invention is directed to a method comprising verifying security of a boot code associated with a peripheral device by performing a security check on the boot code in accordance with a certificate that describes operation of the boot code and executing the boot code based on a result of the security check.

In another embodiment, the invention is directed to a method comprising generating a boot code for a peripheral device from a program written in a high-level programming language and generating a certificate from information gathered while generating the boot code, wherein the certificate describes operation of the boot code.

In yet another embodiment, the invention is directed to a device comprising a control unit to verify security of a boot code associated with a peripheral device by performing a security check on the boot code in accordance with a certificate that describes operation of the boot code and a memory module whereby the control unit executes the boot code based on a result of the security check.

In a further embodiment, the invention is directed to a device comprising a control unit to generate a boot code for a peripheral device from a program written in a high-level programming language and generate a certificate from information gathered while generating the boot code, wherein the certificate describes operation of the boot code.

In yet another embodiment, the invention is directed to a system comprising a peripheral device having a first memory module, wherein the first memory module stores a boot code and a certificate and a computer having a second memory module and a control unit, which retrieves the boot code and the certificate associated with the peripheral device and executes a verification module, wherein the verification module verifies security of the boot code by performing a security check of the boot code in accordance with a certificate that describes operation of the boot code and the control unit further executes the boot code based on a result of the security check.

In yet another embodiment, the invention is directed to a system comprising a peripheral device having a memory module, and a control unit to generate a boot code from a program written in a high-level programming language. The control unit also generates a certificate from information gathered while generating the boot code, wherein the certificate describes operation of the boot code. The control unit further loads the boot code and the certificate into the memory module.

In yet another embodiment, the invention is directed to a computer-readable medium containing instructions. The instructions cause a programmable processor to verify security of a boot code associated with a peripheral device by performing a security check on the boot code in accordance with a certificate that describers operation of the boot code and execute the boot code based on a result of the security check.

In yet another embodiment, the invention is directed to a computer-readable medium containing instructions. The instructions cause a programmable processor to generate a boot code for a peripheral device from a program written in a high-level programming language and generate a certificate from information gathered while generating the boot code, wherein the certificate describes operation of the boot code.

In yet another embodiment, the invention is directed to a method comprising generating a boot code in the fcode programming language for a peripheral device from a program written in the Java programming language and generating a certificate from information gathered while generating the boot code, wherein the certificate describes operation of the boot code.

The details of one or more embodiments of the invention are set forth in the accompanying drawings and the description below. Other features, objects, and advantages of the invention will be apparent from the description and drawings and from the claims.

DETAILED DESCRIPTION

For purposes of illustration, this disclosure refers extensively to methods for ensuring safe operation of boot firmware device drivers within a computer. In some embodiments, however, the invention may be applicable to ensuring safe operation of boot firmware modules, which includes but is not limited to device drivers. Accordingly, a description of verification and generation of device drivers to ensure safe operation within this disclosure should not be considered limiting of the invention as broadly claimed and embodied herein.

Figure 1:
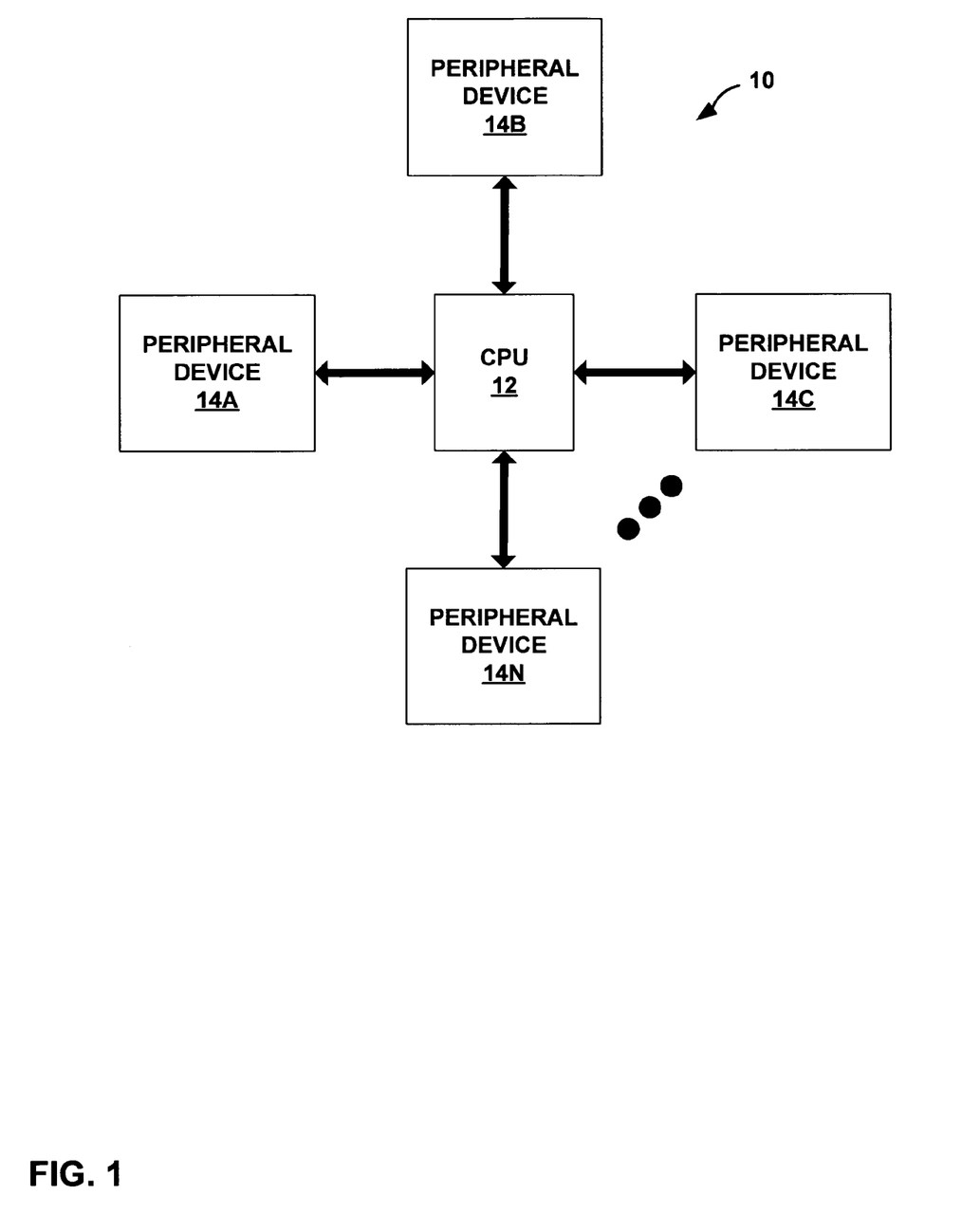
FIG. 1 is a block diagram illustrating a computer system in which a central processing unit is connected to a plurality of peripheral devices.

FIG. 1 is a block diagram illustrating a computer system 10 in which a central processing unit CPU 12 is connected to a plurality of peripheral devices 14A-14N (collectively "peripheral devices 14"). CPU 12 is connected to peripheral devices 14 via a communication interface such that CPU 12 may receive device drivers (not shown) stored within peripheral devices 14. CPU 12 can further operate in accordance with the Open Firmware standard as defined by IEEE-1275, which specifies a process for retrieving the device drivers from peripheral devices 14. Other standards may specify processes for retrieving the device drivers and CPU 12 is not limited to the Open Firmware standard. Moreover, the techniques may be applied to device drivers associated with peripheral devices 14 but centrally stored in a computer-readable medium, such as a boot disk.

In general, device drivers may be viewed as programs that specify a layer of abstraction to peripheral devices 14 so that higher-level software can access peripheral devices 14 in a uniform fashion. In particular, each device driver specifies an application program interface (API) to provide a mechanism for the higher-level software of CPU 12 to access the particular peripheral device. CPU 12 retrieves the device drivers from peripheral devices 14 and, in accordance with the techniques described herein, verifies that the device drivers correctly follow procedures for safe operation according to specified standards for the particular peripheral device and in doing so verifies that the device drivers properly define an API. After verification of the device drivers is complete, CPU 12 executes the device drivers based on the outcome of the verification.

Peripheral devices 14 may include a wide range of devices, such as graphic devices, network controllers and storage controllers, all of which contain different device drivers to allow full functionality of the varying peripheral devices. Exemplary network controllers may include 10 megabit Ethernet controllers, 10/100 megabit Ethernet controllers, Infiniband controllers, iSCSI ("Internet Small Computer System Interface") controllers and the like. Exemplary storage controllers may include IDE/ATA controllers, Serial ATA controllers, SCSI controllers ("Small Computer System Interface"), Fibre Channel controllers, and the like. The verification process, carried out by a program referred to as a verification module, may distinguish device drivers for different devices and analyze the device driver based on the particular peripheral device. Thus, the verification module is a comprehensive program that receives a device driver and analyzes the device driver based on specified criteria corresponding to the particular peripheral device, as described in a certificate associated with the device driver.

The verification techniques are described in more detail in U.S. Provisional Application Ser. No. 60/479,657, entitled "Compilation and Verification of Boot Firmware", filed Jun. 18, 2003, the entire content of which are hereby incorporated by reference.

Since the verification module compares the device driver against the certificate, security is actively ensured independent of a source that generated the device driver. Thus, the verification module actively gauges the reliability of a source that generated the device driver. Moreover, issues of scale do not arise since the verification module is independent of the source. In instances where highly reliable sources unintentionally generate device drivers that threaten security, the verification module can determine the device driver as a security threat with aid from the corresponding certificate, and prevent CPU 12 from executing the driver despite the high reliability of the source. Furthermore, the verification module may detect malicious code despite the source, thus preventing the installation of malicious code under the guise of a reliable source.

The verification module may further perform the verification process on each device driver every time CPU 12 executes a device driver. The process of executing boot device drivers is referred to as the boot process, which occurs every time CPU 12 is reset or powered-up. CPU 12 may execute the verification module during the boot process such that no device driver is executed without first having the verification module verify the device driver. Also, CPU 12 can execute the verification module to analyze device drivers not executed during the boot process, e.g., a plug-and-play method, such that no device driver is executed without first having the verification module examine the device driver. Thus, the verification module can ensure safety each time CPU 12 executes a device driver.

Although described for exemplary purposes herein in reference to a firmware-based module, the verification process may be implemented in software, firmware, hardware, or combinations thereof.

Figure 2:
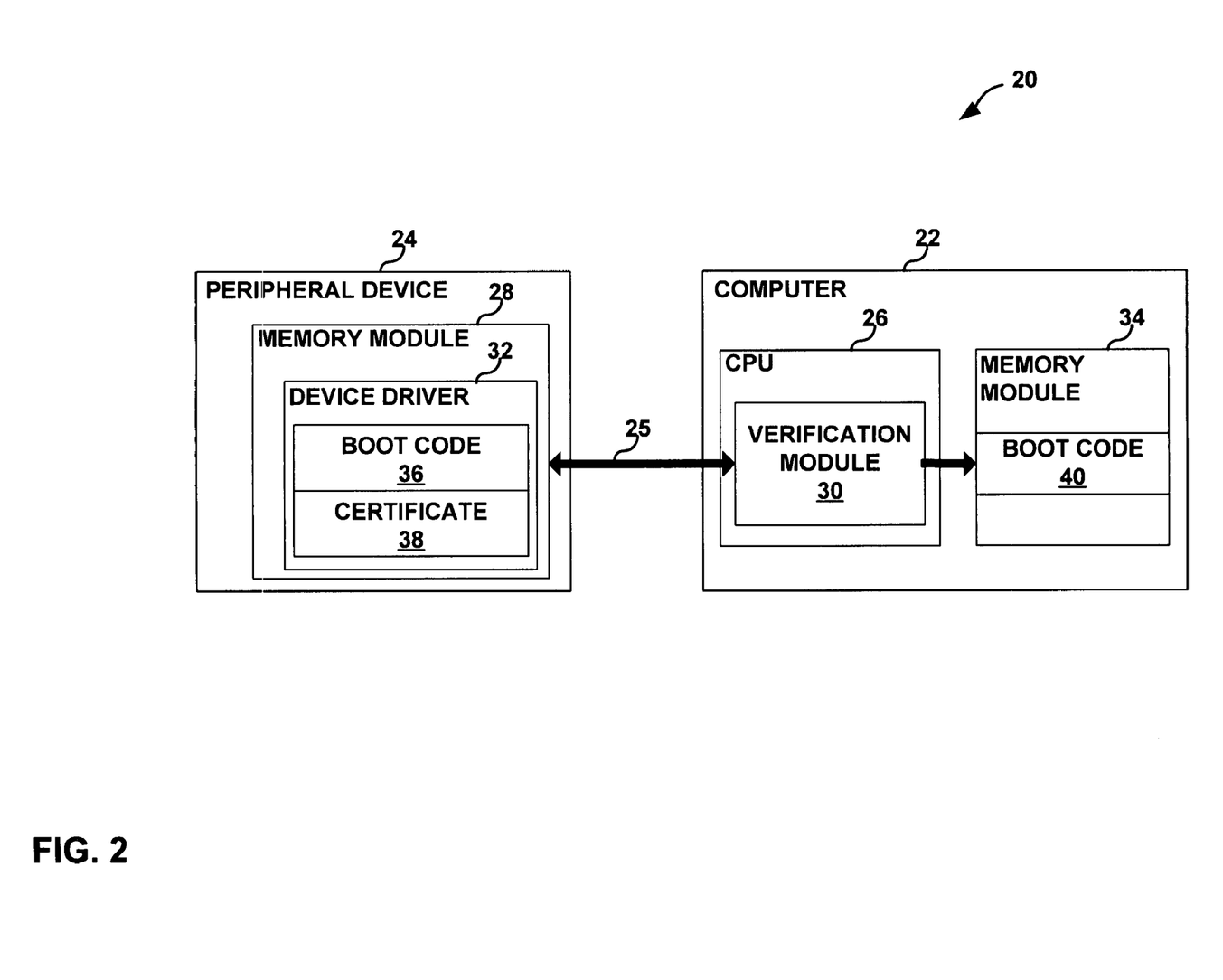
FIG. 2 is a block diagram illustrating an exemplary computer system comprising a computer connected to a single peripheral device.

FIG. 2 is a block diagram illustrating an exemplary computer system 20 comprising a computer 22 connected to a single peripheral device 24. Computer 22 is connected to peripheral device 24 via a communication interface 25, such as an input/output (I/O) bus, for accessing memory module 28 of peripheral device 24. In particular, CPU 26 retrieves a device driver 32 from memory module 28 and executes verification module 30, which analyzes device driver 32 and determines whether device driver 32 is safe to execute.

Device driver 32 comprises boot code 36, which specifies an API for accessing and controlling peripheral device 24. In addition, device driver 32 includes a certificate 36 to aid verification module 30 in determining whether operation of boot code 36 is safe. Memory module 28 may comprise read-only memory (ROM) such as Programmable RPM (PROM), Erasable Programmable ROM (EPROM), Electrically Erasable Programmable ROM (EEPROM), and the like.

Upon receiving device driver 32 from peripheral device 24, verification module 30 proceeds to verify boot code 36 using certificate 38. For example, verification module 30 may perform a three-tier security process to verify boot code 36. Each tier is dependent on the prior tiers, and comprises a series of security checks. Should a security check within a tier fail, verification module 30 declares boot code 36 as unsafe and CPU 26 does not execute boot code 36. However, if verification module 30 declares boot code 36 as safe, i.e., boot code 36 passes the security checks of each tier, CPU 26 executes a copy of boot code 36. Boot code 40 represents a copy of boot code 36 and CPU 26 loads a copy of boot code 36 into memory module 34 as boot code 40. Consequently, boot code 40 comprises a series of instructions to initialize peripheral device 24 and upon execution of these instruction by CPU 26, higher-level programs, e.g., an operating system executing on CPU 26, interact with peripheral device 24. In this manner, boot code 40 enables and provides for interactions between computer 22 and peripheral device 24.

In some embodiments, computer 22 may connect to a plurality of peripheral devices, as illustrated in FIG. 1. Furthermore, verification module 30 may perform the three-tier security process on a plurality of device drivers associated with the plurality of peripheral devices. The process proceeds as described above, wherein upon receiving device drivers from each peripheral device, verification module 30 performs the three-tier security process, declares each boot code associated with a device driver as safe or unsafe, and CPU 26 executes a copy of the boot code. Moreover, CPU 26 may execute verifications module 30 at any time for "inline" verifications. For example, CPU 26 may execute verification module 30 during a boot process or upon executing device drivers during normal operation, e.g., plug-and-play, to verify the safety of the device driver before executing the boot code. In this manner, verification module 30 actively verifies security for each device driver before executing the associated boot code, independent of a source that generated the device driver.

Figure 3:
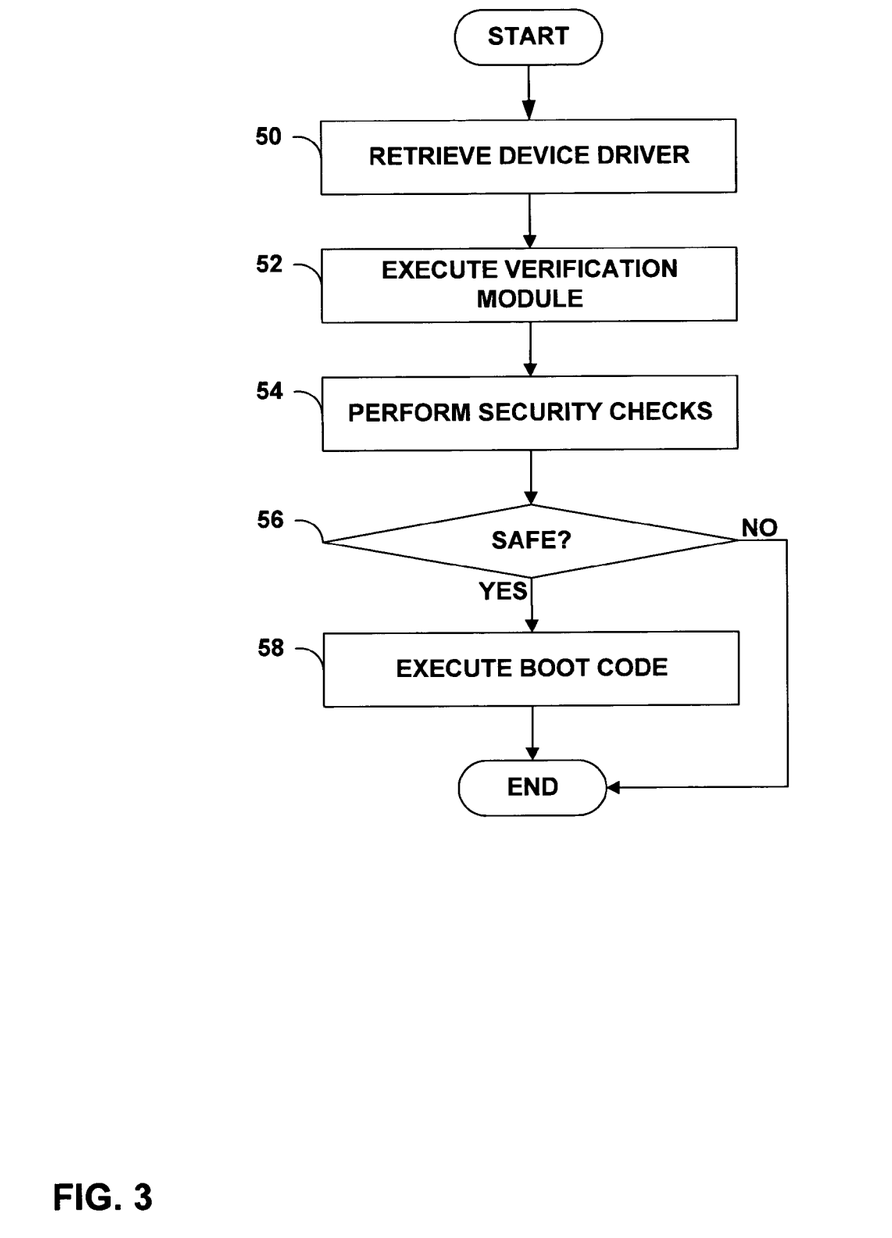
FIG. 3 is a flowchart illustrating an exemplary process whereby a computing device actively verifies the security of device drivers.

FIG. 3 is a flow chart illustrating an exemplary process whereby a computing device, e.g., computer 22 of FIG. 2, actively verifies the security of device drivers. Specifically, computer 22 performs the illustrated exemplary process to verify device driver 32 stored on memory module 28 of peripheral device 24.

Computer 22 beings the process by retrieving device driver 32 (50). CPU 26 may execute instructions to establish communication with peripheral device 24 to retrieve device driver 32. CPU 26 may further conform to standards, such as the Open Firmware standard as define by IEEE-1275, which specifies a protocol for retrieving device driver 32. Upon retrieving device driver 32, CPU 26 executes verification module 30 (52).

Verification module 30 performs a series of security checks (54), which may be implemented in three tiers, on device driver 32. As described above, device driver 32 comprises boot code 36 and certificate 38. Each tier is dependant on the prior tiers and comprises a series of security checks. Verification module 30 applies each tier to boot code 36 with aid from certificate 38 to determine whether a copy of boot code 36 is safe to execute (56). Certificate 38 aids verification module 30 by indicating where in boot code 36 to apply the security checks. Certification 38 may also specify the type of security check to perform at the specified location within boot code 36. If boot code 36 fails any of the security check then boot code 36 is declared unsafe and is not executed thereby preventing security threats. However, in the event that boot code 36 passes all of the security checks, verification module 30 declares boot code 36 as safe and CPU 26 executes a copy of boot code 36, i.e., boot code 40.

Figure 4:
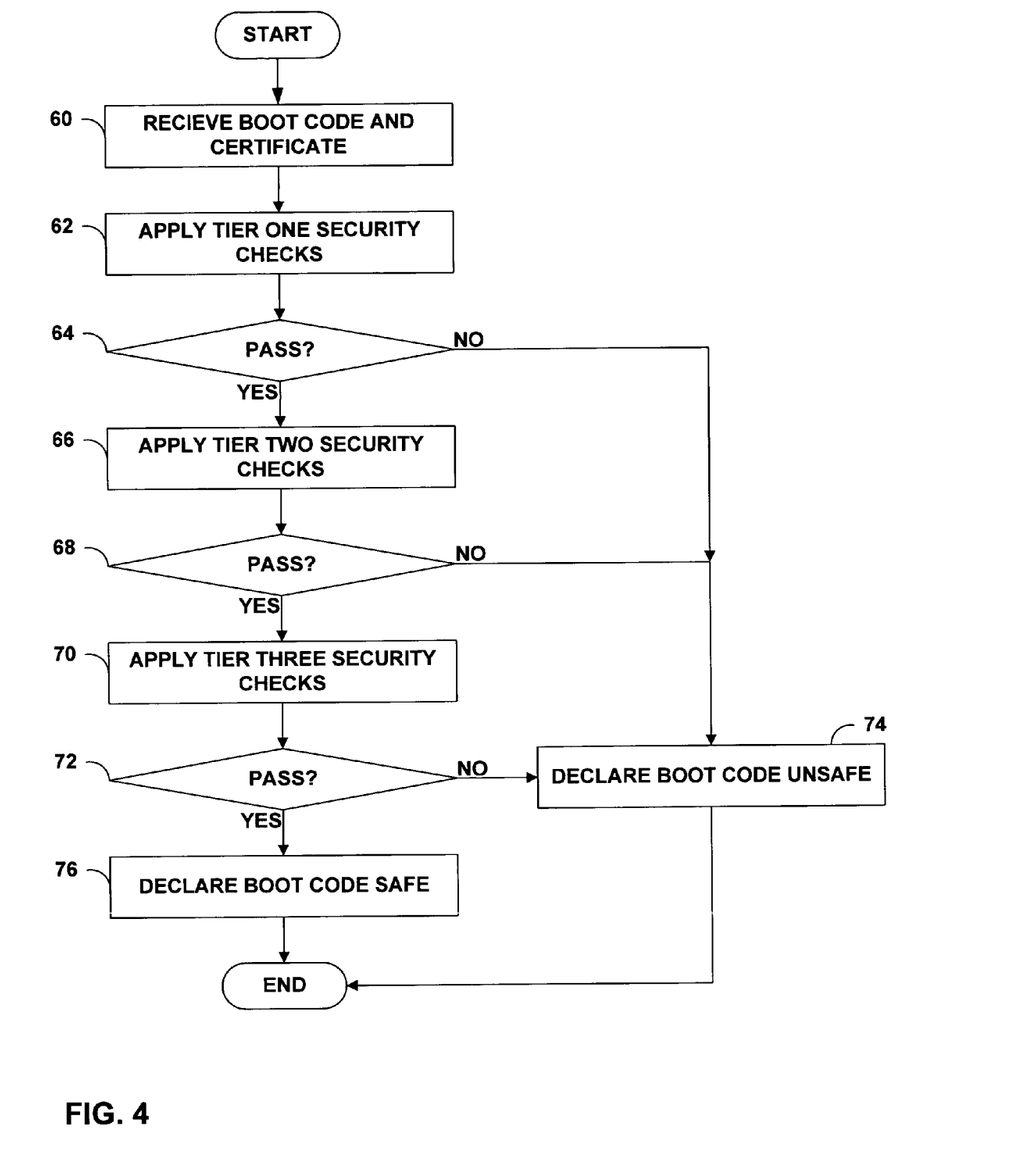
FIG. 4 is a flowchart illustrating an exemplary process whereby a verification module actively ensures the safety of device drivers by applying security checks in a three-tier process.

FIG. 4 is a flow chart illustrating an exemplary process whereby verification module 30 actively ensures the safety of device drivers by applying security checks in a three-tier process. Each tier of the three-tier process comprises a series of security checks to ensure the safety of device drivers. In this manner, computer 22 (FIG. 2) may rely solely on verification module 30 to provide active security verifications of device drivers.

Specifically, verification module 30 applies the three-tier process to device driver 32, which CPU 26 retrieves from peripheral device 24 for processing by verification module 30. Each tier is applied to boot code 36 with aid from certificate 38, both of which are associated with device driver 32. Furthermore, each tier is dependent on the prior tiers, except the first tier, which comprises basic safety security checks. Should any security check included within a tier fail, verification module 30 need not apply any further security checks and declares boot code 36 unsafe. However, if boot code 36 passes each tier of security checks then verification module 30 declares boot code 36 safe.

The description as follows uses the abstraction of tiers to represent application of security checks by verification module 30 in a set of stages or phases. The tier abstraction aids in defining a mechanism for applying checks and aids in illustrating principles of the inventions, but other techniques for application of security checks within computer 22 are readily applicable. For example, verification module 30 may apply security checks without any recognition of tiers. Instead, verification module 30 may seamlessly apply security checks in a manner to resolve tier dependency, one after another until either boot code 36 passes all security checks or fails a security check.

Verification module 30 applies security checks according to certificate 38, which indicates lines of code within boot code 36 to begin applying the security checks. Certificate 38 may further define the type of security check for verification module 30 to apply. Consequently, using certificate 38, verification module 30 may quickly perform security checks to pertinent portions of boot code 36 without having to analyze every portion of boot code 36. Since certificate 38 allows verification module 30 to perform security checks without analyzing every portion of boot code 36, the computing time required to verify boot code 36 is reduced and, consequently, CPU 26 may execute verification module 30 "inline" with the execution of device drivers. "Inline" active verification of device drivers may provide assurance that no device driver is executed without first being verified.

CPU 26 executes verification module 30 after retrieving device driver 32 from memory module 28. Verification module 30 receives device driver 32, which comprises boot code 36 and certificate 38 (60) from CPU 26. Upon receiving device driver 32, verification module 30 begins applying tier one security checks (62) according to certificate 38. The first tier uses Efficient Code Certification (ECC) providing a basic security policy to ensure type-safety. ECC is a form of language-based security employing inexpensive static checks on boot code and certificate in order to verify dynamic safety properties. Tier one may apply safety checks very similar to that of a Java verifier program which also ensures type-safety. Specifically tier one may ensure type safety, control flow safety, memory safety and stack safety, similar to the verification of Class files performed by the Java Virtual Machine.

Certificate 38 comprises information collected during compilation of boot code 36, e.g., by a compiler, as described in further detail below. Verification module 30 applies the static checks using principles of ECC to boot code 36 according to certificate 38, thereby ensuring type safety, control flow safety, memory safety and stack safety. Specifically, verification module 30 ensures control flow safety using static security checks to verify that boot code 36 only accesses addresses containing valid instructions within boot code 36. Verification module 30 also ensures memory safety by, again, applying static checks to verify that boot code 36 only causes CPU 26 to accesses valid locations within the data segment CPU 26 assigned to boot code 36, system heap memory CPU 26 explicitly allocated to boot code 36, and valid stack frames. Verification module 30 applies further static checks, which verify that boot code 36 properly preserves the stack across all subroutine calls, to ensure stack safety.

Verification module 30 applies the tier one security checks to boot code 36 with aid from certificate 38 based on principles of ECC and evaluates the result of each individual security check (64). If boot code 36 fails to pass any of the security checks of tier one, then verification module 30 declares boot code 36 unsafe (74) and does not continue applying any further security checks. No further security checks are applied since each tier is dependent on the prior tiers, thus failing tier one implies failure of tier two and tier three. However, verification module 30 continues to apply tier two security checks if boot code 36 passes all the security checks associated with tier one (66).

ECC may further aid in both tier two and tier three security checks. Verification module 30 using ECC may perform lightweight, inexpensive security checks, which are included within tier two and three. Since the security checks are relatively inexpensive, CPU 26 may execute verification module 30 prior to executing device drivers, either before a boot process or before executing device drivers during normal operation, such as is one by the plug-and-play method. Again, this "inline" execution of verification module 30 may ensure that no device drivers are executed without first being verified.

Tier two security checks comprise security checks to ensure device encapsulation. Ensuring device encapsulation involves a process verification module 30 performs to ensure that each peripheral device, such as peripheral device 24, is operated directly or indirectly only by the device driver associated with the peripheral device, such as device driver 32 associated with peripheral device 24. For the verification of directly operated devices, verification module 30 ensures that only the device driver associated with a peripheral device actually is used to operate the device. Some devices, such as those connected to the processor via expansion busses, are only operated indirectly via a chain of other devices, wherein the device drivers associated with these devices access the bus. These prove harder for verification module 30 to verify. However, indirect access methods are pre-specified and highly controlled, providing verification module 30 with a basis to verify boot code of such indirectly operated devices.

Verification module 30 may verify device encapsulation for indirectly operated devices by observing a pattern of calls to a program procedure, such as the mapin procedure specified by the Open Firmware standard, which perform address translation in a standardized manner. Verification module 30 may analyze the pattern of program procedure calls and compare them with the highly controlled and pre-specified methods for calling this program to determine appropriate use of the peripheral device, such as peripheral device 24. Furthermore, verification module 30 can verify that the above address translation procedure only accesses addresses allocated to the particular device. Verification module 30 may accomplish the above quickly using certificate 38, which ensures that all indirect accesses occur using a pre-specified verification API, which is described below. Using this verification API ensures proper security, since the verification API follows the specified and highly controlled standards meant to ensure safe indirect accesses.

After applying tier two security checks to ensure device encapsulation, verification module 30 may analyze the results of each security check. Again, verification module 30 declares boot code 36 as unsafe (74) once verification module 30 determines that boot code 36 fails any one of the security checks of tier two.

When boot code 36 passes all the security checks of tier two, verification module 30 applies the next tier of security checks, i.e., tier three (70). Tier three security checks allow verification module 30 to protect against specific harm. Tier three security checks may be based on architectural constraints or dependent upon standards, such as the Open Firmware standard as defined by IEEE-1275. For example, tier three security checks may comprise security checks to ensure device driver 32 does not access a device more than a pre-determined number of times. By restricting device accesses to the pre-determined number, verification module 30 may prevent denial-of-service attacks. Tier three security checks may further prevent specific security threats other than denial-of-service attacks.

After applying tier three security checks, verification module 30 determines whether boot code 36 is safe or unsafe (72). Verification module 30 examines the results and declares boot code 36 unsafe (74) if boot code 36 fails a single tier three security check. Otherwise, verification module 30 declares boot code 36 safe (76).

Each of the tiers as described above comprises security checks enabling verification module 30 to declare boot code 36 as either safe or unsafe. If at any point boot code 36 fails a single security check then verification module 30 declares boot code 36 unsafe. Thus, verification module 30 is a comprehensive security verification program that actively checks the safety of boot code 36 using certificate 38 to quickly verify whether boot code 36 is safe. Furthermore, CPU 26 may execute verification module 30, which utilizes certificate 38 as described above, inline with the device driver execution, thus ensuring device driver safety each time CPU 26 executes a device driver. Verification module 30 may use a verification process comprising three tiers as described above or may verify boot codes using any other process consistent with the principles of the invention.

Figure 5:
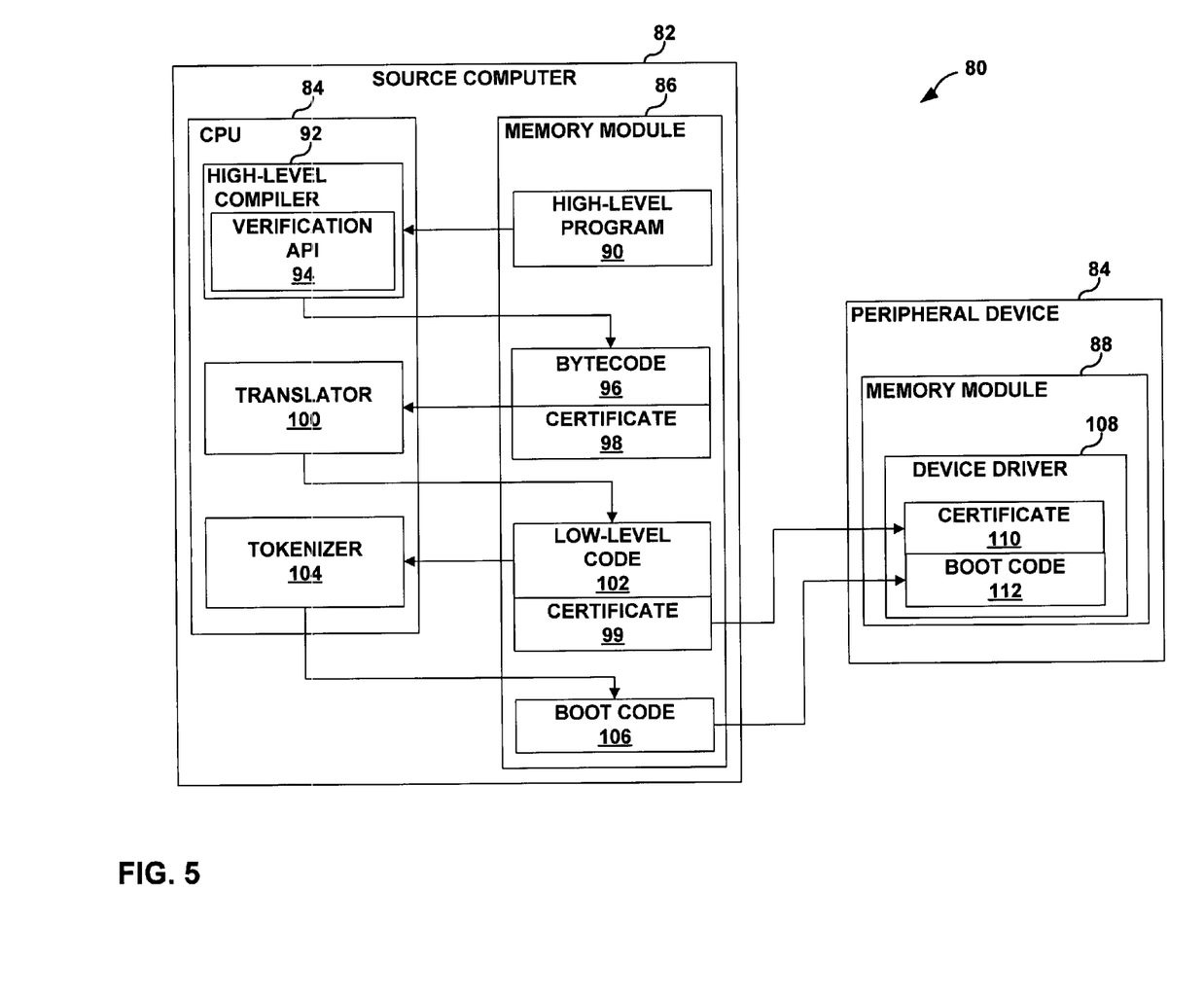
FIG. 5 is a block diagram illustrating an example computer system, wherein a source computer generates a device driver for a peripheral device.

FIG. 5 is a block diagram illustrating an example computer system 80, wherein a source computer 82 generates a device driver 108 for a peripheral device 84. Specifically, source computer 82 generates device driver 108 via a process whereby a series of programs process high-level program 90 to generate certificate 99 and associated boot code 106. Device driver 108, comprising certificate 99 and boot code 106, may then be loaded onto memory module 88 of peripheral device 84.

The compilation process from a high-level language program, e.g., high-level program 90, to boot code 106 may comprise any number of steps and involve a plurality of programs in cooperation to achieve the compilation process. The process described herein is an example of one embodiment of the invention and should not be considered as a sole representative of the invention on the whole. Furthermore, high-level program 90 may comprise object oriented high-level languages such as Java, C++, Visual Basic and the like. Also, boot code 106 may conform to a standard, such as the Open Firmware standard as defined by IEEE-1275, which may specify a particular code language, such as fcode, and format.

The compilation techniques are described in more detail in U.S. Provisional Application Ser. No. 60/479,657, entitled "Compilation and Verification of Boot Firmware", filed Jun. 18, 2003, the entire content of which is hereby incorporated by reference.

Source computer 82 comprises CPU 84 and memory module 86. CPU 84 may execute various programs which accesses memory module 86 and may further write data to addresses within memory module 86. The process of compiling high-level program 90 into certificate 99 and boot code 106 may begin once high-level program 90 is complete and an operator of source computer 82 instructs CPU 84 to begin the process.

CPU 84 begins the compilation process of high-level program 90 by executing high-level compiler 92 and accessing memory module 86 in order to retrieve high-level program 90. High-level compiler 92 compiles code specific to the high-level language used to construct high-level program 90. For example, if high-level program 90 is written in Java, then high-level compiler 92 performs some of the functions of typical Java compilers. Furthermore, high-level compiler 92 has knowledge of verification API 94 and specifies compilation instructions pertinent to verification API 94.

Prior to compiling high-level program 90, compiler 92 analyzes high-level program 90 and verifies that high-level program 90 adheres to a pre-determined safety policy. Specifically, high-level program 90 corresponds to a device driver written in a high-level language and high-level compiler 92 verifies that the device driver conforms to all or part of the three-tier security policy discussed above. During compilation of high-level program 90, high-level compiler 92 processes instructions associated with high-level program 90 to construct bytecode 96 and may verify proper use of verification API 94 encoding relevant information to certificate 98. High-level compiler 92 may construct certificate 98 to include information gathered during the compilation of bytecode 96. In some embodiments certificate 98 is produced as a piece of data separate from bytecode 96. Other embodiments may produce certificate 98 as an integral part of bytecode 96. In these latter embodiments, the information of certificate 98 is incorporated in such a way that it is easily extractable from the combination.

High-level compiler 92 with knowledge of verification API 94 also generates certificate 98. Certificate 98 is an annotation of blocks of bytecode 96, which constitutes proof of why bytecode 96 and eventually boot code 106 meet specified safety conditions. For example, high-level compiler 92 may determine the information corresponding to a variable in high-level program 90 and incorporate this information into certificate 98. The annotations of certificate 98 assert proof, which a verification module, such as verification module 30 of FIG. 2 may verify, that a block of bytecode 96 and a resulting block of boot code 106 are safe. To continue the above example, verification module 30 may quickly check the type of the variable using the type information corresponding to the variable found in certificate 98. Thus, verification module 30 may quickly apply the security check since verification module 30 does not need to re-determine the type of the variable. In full, verification module 30 may quickly verify boot code 106 such that if all the assertions prove true then verification module 30 may declare boot code 106 as safe.

In some embodiments, boot code 106 may conform to a standard, such as the Open Firmware standard. Some standards specify a specific code language, such as fcode, for which boot code 106 conforms to follow the standard. Bytecode 96 typically is not a suitable boot code and CPU 84 may further process bytecode 96 to generate boot code 106 such that boot code 106 conforms to a standard.

In particular, most device drivers and boot firmware are written in low-level languages, such as Forth. Translator 100 interprets bytecode 96 and generates low-level code 102. Furthermore, most low-level languages are not object-oriented languages, thus, translator 100 must further process object-oriented bytecode 96 to generate non-object oriented low-level code 102.

During translation, translator 100 may analyze certificate 98, together with bytecode 96, gather additional information necessary to complete the three tiered verification process described above and add this information to certificate 98. Again, this information may allow a verification module, such as verification module 30, to quickly ascertain the safety of boot code, as described above. Translator 100 then writes certificate 98 with the new additions, possibly translated to a new format, to memory module 86, shown in FIG. 5 as certificate 99. In some embodiments certificate 98 is produced as a piece of data separate from bytecode 96. Other embodiments may produce certificate 98 as an integral part of bytecode 96. In these latter embodiments, the information of certificate 98 is incorporated in such as way that it is easily extractable from the combination.

An additional program, i.e. tokenizer 104, may also process low-level code 102 to generate boot code 106. CPU 84 may again execute tokenizer 104 to process low-level code 102 to generate boot code 106, such that boot code 106 conforms to a standard. Tokenizer 104 analyzes low-level code 102 and generate boot code 106 in a format, e.g. a ROM image, that allows source computer 82 to install boot code 106 onto memory module 88.

Upon completion of the compilation process, i.e., completion of the execution of tokenizer 104, source computer 82 may install boot code 106 and certificate 99 to memory module 88 of peripheral device 84. Source computer 82 may "flash" certificate 99 and boot code 106 onto any of the above mentioned ROM types, which memory module 88 may represent, forming device driver 108. Memory module 88 is not limited to storing one device driver, i.e., device driver 108, but may store many device drivers corresponding to various device aspects associated with peripheral device 84. Furthermore, memory module 84 may store any other data, including data from computers other than source computer 82.

The process of writing high-level program 90, a device driver, in a high-level language, compiling the code with high-level compiler 92, and translating the code via translator 100 to low-level code 102 may greatly aid programmers who author device drivers. In particular, object oriented code provides for easy organization and allows programmers to work in groups to create a single program, such as high-level program 90. Low-level code 102, in most cases, does not suit group programming or convenient organization, thus the above process may decrease the time needed to create device drivers by offering the ability to increase throughput through group work and organization.

Figure 6:
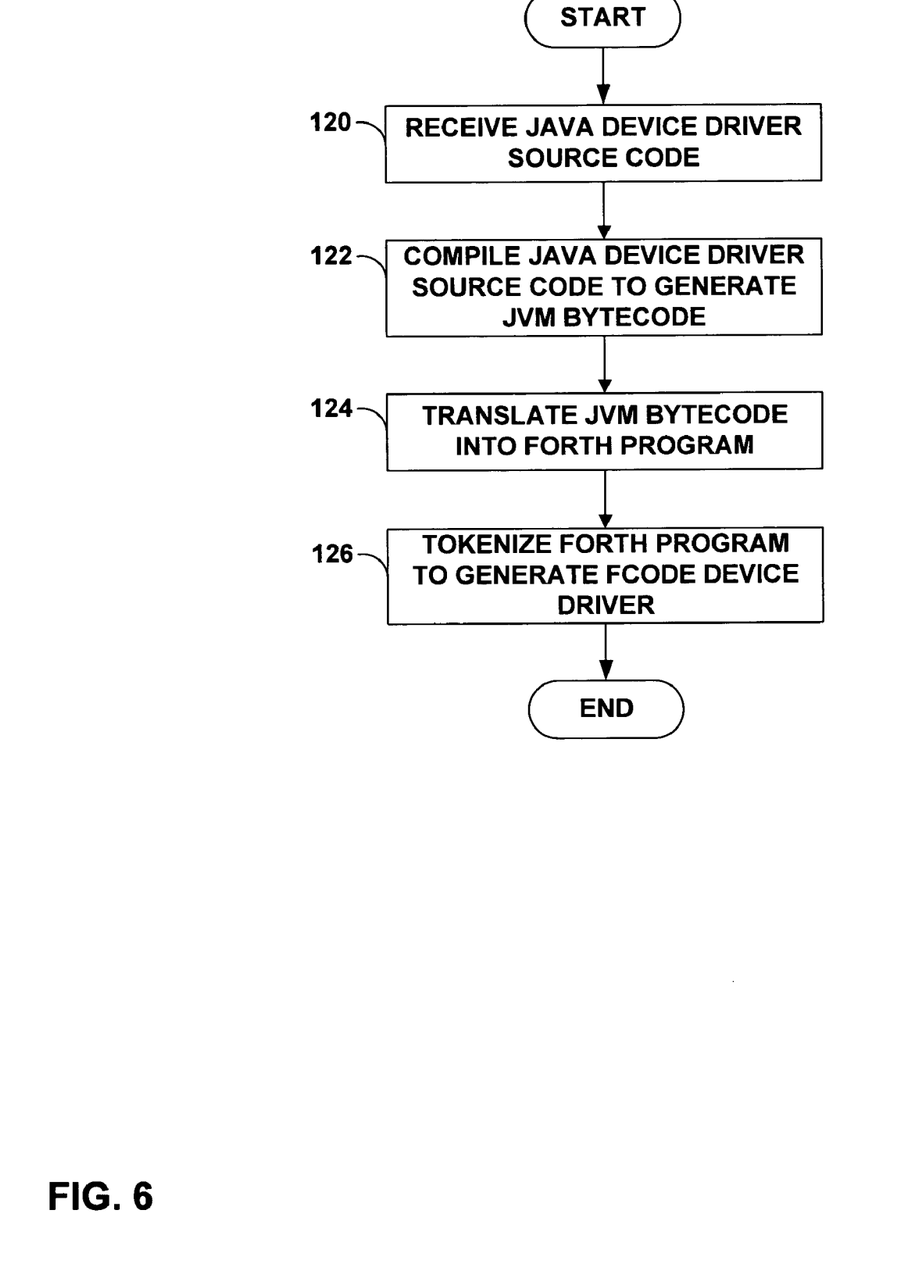
FIG. 6 is a flow chart illustrating an exemplary process whereby a source code for a device driver written in a high-level language is complied into a low-level language device driver.

FIG. 6 is a flow chart illustrating an exemplary process whereby a source code for a device driver written in a high-level language is compiled into a low-level language device driver. As one example, the device driver source code can be written in the Java high-level language and complied into a low-level language, e.g., fcode, device driver through a process in which several computer programs cooperate to complete the compilation process. Consequently, in one embodiment, the fcode device driver conforms to the Open Firmware standard as specified by IEEE-1275.

The process as outlined above may proceed with CPU 84 of source computer 82 (FIG. 5) receiving the java device driver source code (120) as represented by high-level program 90. CPU 84 then executes high-level compiler 92 to compile the device driver written in Java, i.e., high-level program 90. High-level compiler 92 with knowledge of verification API 94 complies the java device driver to generate Java Virtual Machine (JVM) bytecode, i.e., bytecode 96 (122). High-level compiler 92 may ensure certain functions associated with verification API 94 are called appropriately and encode the use of these functions into certificate 98.

CPU 84 stores the JVM bytecode to memory and executes translator 100. Translator 100 takes JVM bytecode and generates a Forth program (124), which is represented as low-level code 102. As discussed generally above, translator 100 converts the object oriented nature of the JVM bytecode into a forth program, which does not support objects. Furthermore, translator 100 may fix problems, such as lazy class loading and initialization that normally occur in Java, during translation. Translator 100 may also make additions to certificate 98 and store certificate 99, which incorporates the new additions, to memory module 86.

The forth program represented as low-level code 102 is finally tokenized into fcode, or boot code 106 (126). The process of tokenizing with respect to the forth program comprises compiling the fourth program into fcode. This process is described in detail in the Open Firmware standard. The following is an example of translating one or more blocks or fragments of code of a second programming language, e.g., Java, into one or more corresponding blocks of fragments of boot code of a first programming language, e.g., Forth. The example is described with respect to Java user class files, but the translator may translate any type of block or fragment of code of the second programming language into the one or more blocks of boot code of the first programming language.

As described in more detail on pp. 10-11 of U.S. Provisional Application ser. No. 60/479,657, filed Jun. 18, 2003, in one example the J2F compiler takes Java class files supplied by the user and compiles them into a Forth program. This may be the middle step of a 3-step compilation process: (1) from Java to Java bytecode, (2) Java bytecode to Forth source code, and (3) Forth source code to Forth virtual machine code (fcode). That is, the class files that J2F takes as input can be those that would be produced by any standard Java compiler. The output of J2F is Forth source code that is tokenized by the tokenizer to produce Forth virtual machine code (fcode).

Forth is a low-level stack-based language that resembles the Java Virtual Machine in many respects. The main similarity is that it is stack-based, therefore much of the straight-line code produced by J2F is a fairly direct translation of corresponding Java bytecode. For example, the Microsoft Java compiler, given the Java fragment:

int x=1;
int y=2;
int z=x+y;

produces the Java bytecode

```
iconst_1
istore_1
iconst_2
istore_2
iload_1
iload_2
iadd
istore_3
```

The J2F compiler translates this to the following corresponding Forth fragment:

```
1                           \ iconst_1
depth r@ - $replace         \ istore_1
2                           \ iconst_2
depth r@ - 1 + $replace     \ istore_2
depth r@ - 1 + pick         \ iload_1
depth r@ - 2 + pick         \ iload_2
+                           \ iadd
depth r@ - 2 + $replace     \ istore_3
```

A certifying compiler may comprise these three steps whereby verification module 30 of FIG. 2 may verify the resulting fcode device driver to determine whether the resulting fcode device driver is safe for computer 22 to execute. The certifying compiler that performs the above process ensures safety by verifying the java device driver prior to proceeding with the compilation process. If the java device driver is declared unsafe by the certifying compiler, then source computer 82 will not proceed with compiling of the java device driver, i.e., high-level program 90. Thus, only verifiably safe high-level programs are compiled by source computer 82.

The compilation process as described above may incorporate several programs, i.e., high-level compiler 92, translator 100, tokenizer 104, working in cooperation to compile high-level program 90 into boot code 106. Furthermore, the compilation process may generate certificate 99, allowing a verification module, such as verification module 30, to quickly ensure safe operation of boot code 106 prior to executing boot code 106. Using both a certifying compiler, comprising for example, the before mentioned several programs, and a verification module, active security measures may ensure the safe operation of boot code, such that the reliability of the boot code is determined dependent on the boot code and independent of the source.

Various embodiments of the invention have been described. These and other embodiments are within the scope of the following claims.

What is claimed is:

1. A method comprising:
   upon power-up of a computer, retrieving boot code and a certificate from a peripheral device coupled to the computer, the certificate describing operation of the boot code for initializing the peripheral device, wherein the boot code is generated from a first programming language, and wherein the certificate includes an annotation defining a proof of security and safety for both (i) one or more blocks of code generated from a second programming language different from the first programming language and (ii) one or more corresponding blocks of the boot code resulting from translation of the one or more blocks of the code of the second programming language into the first programming language;
   verifying, with the computer, security of the boot code associated with the peripheral device by performing a security check on the boot code in accordance with the certificate; and
   executing the boot code with the computer to (i) initialize the peripheral device based on a result of the security check and (ii) provide, subsequent to the initialization, an interface by which the computer controls operation of the peripheral device.

2. The method of claim 1, wherein verifying the security of the boot code includes verifying the boot code via Efficient Code Certification that specifies a process for performing the security check on the boot code as indicated by the certificate.

3. The method of claim 1, wherein the certificate further indicates a type of security check to perform.

4. The method of claim 3, wherein the type of security check comprises one of a security check to enforce type safety, a security check to enforce control flow safety, a security check to enforce memory safety, a security check to enforce stack safety, a security check to enforce device encapsulation and a security check to enforce prevention of specific forms of harm.

5. The method of claim 1, wherein the boot code includes boot firmware.

6. The method of claim 5, wherein the boot firmware conforms to Open Firmware standard IEEE-1275.

7. The method of claim 1, wherein verifying the safety of the boot code occurs inline such that verifying the safety of the boot code occurs in real time prior to executing the boot code.

8. The method of claim 1, wherein the boot code includes boot code defining a device driver to initialize the peripheral device and define an application program interface for accessing and controlling the peripheral device.

9. The method of claim 1,
   wherein the first programming language comprises a non-object oriented programming language, and
   wherein the second programming language comprises an object oriented programming language.

10. A device comprising:
    an interface to retrieve boot code and a certificate from a peripheral device upon power-up of the device, wherein the boot code is generated from a first programming language, and wherein the certificate includes annotation information defining independently verifiable proofs of security and safety for both (i) one or more blocks of code generated from a second programming language different from the first programming language and (ii) one or more corresponding blocks of the boot code resulting from the translation of the one or more blocks of the second programming language into the first programming language;
    a memory module to store the boot code from the peripheral device; and a control unit to verify security of the boot code associated with the peripheral device by performing a security check on one or more blocks of the boot code in accordance with the certificate, the control unit configured to execute the boot code to (i) initialize the peripheral device based on a result of the security check and (ii) provide, subsequent to the initialization, an interface by which the control unit controls operation of the peripheral device.

11. The device of claim 10, wherein the control unit verifies the boot code using principles of Efficient Code Certification.

12. The device of claim 10, wherein the certificate further indicates a type of security check to perform.

13. The device of claim 12, wherein the type of security check comprise one of a security checks to enforce type safety, a security check to enforce control flow safety, security checks to enforce memory safety, security checks to enforce stack safety, security checks to enforce device encapsulation and security checks to enforce prevention of specific forms of harm.

14. The device of claim 10, wherein the boot code includes boot firmware.

15. The device of claim 14, wherein the boot firmware conforms to Open Firmware standard IEEE-1275.

16. The device of claim 10, wherein the control unit verifies the safety of the boot code in real time prior to executing the boot code.

17. The device of claim 10, wherein the boot code defines a device driver to initialize the peripheral device and define an application program interface for accessing and controlling the peripheral device.

18. The device of claim 10,
wherein the first programming language comprises a non-object oriented programming language, and
wherein the second programming language comprises an object oriented programming language.

19. A system comprising:
a peripheral device having a memory module, wherein the memory module stores a boot code and a certificate,
wherein the boot code is generated from a first programming language, and
wherein the certificate includes an annotation defining a proof of security and safety for both (i) one or more blocks of code generated from a second programming language different from the first programming language and (ii) one or more corresponding blocks of the boot code, and
a computer having an interface to retrieve the boot code and the certificate from the peripheral device, a second memory module and a control unit, wherein the control unit uses the interface to retrieve the boot code and the certificate from the peripheral device and executes a verification module that verifies security of the boot code by performing a security check on the boot code to independently verify the proof represented by the annotation information of the certificate, and
wherein the control unit further executes the boot code based on a result of the security check to (i) initialize the peripheral device and (ii) provide, subsequent to the initialization, an interface by which the control unit controls operation of the peripheral device.

20. The system of claim 19, wherein the control unit verifies the boot code using principles of Efficient Code Certification.

21. The system of claim 19, wherein the certificate further indicates a type of security check to perform.

22. The system of claim 21, wherein the type of security check comprise one of a security check to enforce type safety, a security check to enforce control flow safety, a security check to enforce memory safety, a security check to enforce stack safety, a security check to enforce device encapsulation and a security check to enforce prevention of specific forms of harm.

23. The system of claim 19, wherein the verification module verifies the safety of the boot code in real time prior to executing the boot code.

24. The system of claim 19, wherein the boot code defines a device driver to initialize the peripheral device and to define an application program interface for accessing and controlling the peripheral device.

25. The system of claim 19, wherein the peripheral device comprises one of a graphic device, network controller and storage controller.

26. The system of claim 19,
wherein the first programming language comprises a non-object oriented programming language, and
wherein the second programming language comprises an object oriented programming language.

27. The system of claim 19, wherein the one or more corresponding blocks of the boot code result from translation of the one or more blocks of the code of the second programming language into the first programming language.

28. A computer-readable medium comprising instructions for causing a programmable processor to:
retrieve boot code from a peripheral device, wherein the boot code is generated from a first programming language;
store the boot code on a computer coupled to the peripheral device;
verify security of the boot code associated with the peripheral device by performing a security check on the boot code in accordance with a certificate that describes operation of the boot code,
wherein the certificate includes an annotation defining a proof of security and safety for both (i) one or more blocks of code generated from a second programming language different from the first programming language and (ii) one or more corresponding blocks of the boot code resultant from translation of the one or more blocks of the code of the second programming language into the first programming language; and
execute the boot code based on a result of the security check to (i) initialize the peripheral device and (ii) provide, subsequent to the initialization, an interface by which the programmable-processor controls operation of the peripheral device.

29. The computer-readable medium of claim 28, wherein the instructions for causing the programmable processor to verify the security of the boot code includes instructions to verify the boot code using principles of Efficient Code Certification.

30. The computer-readable medium of claim 28, wherein the certificate further indicates a type of security check to perform.

31. The computer-readable medium of claim 30, wherein the type of security check comprise one of a security check to enforce one of type safety, a security check to enforce control flow safety, a security check to enforce memory safety, a security check to enforce stack safety, a security check to enforce device encapsulation and a security check to enforce prevention of specific forms of harm.

32. The computer-readable medium of claim 28, wherein the boot code includes boot firmware.

33. The computer-readable medium of claim 32, wherein the boot firmware conforms to Open Firmware standard IEEE-1275.

34. The computer-readable medium of claim 28, wherein instruction causing the programmable processor to verify the safety of the boot code includes instructions causing the programmable processor to verify the safety of the boot code in real time prior to executing the boot code.

35. The computer-readable medium of claim 28, wherein the boot code includes boot code defining a device driver to initialize the peripheral device and to define an application program interface for accessing and controlling the peripheral device.

36. The computer-readable medium of claim 28,
wherein the first programming language comprises a non-object oriented programming language, and
wherein the second programming language comprises an object oriented programming language.

* * * * *

UNITED STATES PATENT AND TRADEMARK OFFICE
CERTIFICATE OF CORRECTION

| | | |
|---|---|---|
| PATENT NO. | : 7,467,417 B2 | Page 1 of 1 |
| APPLICATION NO. | : 10/656751 | |
| DATED | : December 16, 2008 | |
| INVENTOR(S) | : Matthew A Stillerman et al. | |

It is certified that error appears in the above-identified patent and that said Letters Patent is hereby corrected as shown below:

On the title page item (57) Abstract, line 8, "certificate, which is associated with the boot ode in" should read -- certificate, which is associated with the boot code in --

In the Specification

Column 6, line 5, "includes a certificate 36" should read -- includes a certificate 38 --

Column 6, line 55, "Computer 22 beings the" should read -- Computer 22 begins the --

Signed and Sealed this
First Day of September, 2015

Michelle K. Lee
*Director of the United States Patent and Trademark Office*